US006210332B1

(12) United States Patent
Chiao et al.

(10) Patent No.: US 6,210,332 B1
(45) Date of Patent: *Apr. 3, 2001

(54) METHOD AND APPARATUS FOR FLOW IMAGING USING CODED EXCITATION

(75) Inventors: Richard Yung Chiao, Clifton Park, NY (US); David John Muzilla, Mukwonago; Anne Lindsay Hall, New Berlin, both of WI (US); Cynthia Andrews Owen, Memphis, TN (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/437,605

(22) Filed: Nov. 10, 1999

Related U.S. Application Data

(63) Continuation-in-part of application No. 09/299,034, filed on Apr. 23, 1999, now abandoned, which is a continuation-in-part of application No. 09/065,212, filed on Apr. 23, 1998, which is a continuation-in-part of application No. 09/052,789, filed on Mar. 31, 1998, now abandoned.

(51) Int. Cl.[7] ...................................................... A61B 8/00

(52) U.S. Cl. ........................... 600/443; 600/447; 128/916

(58) Field of Search ..................................... 600/437, 443, 600/447; 128/916; 73/625–627

(56) References Cited

U.S. PATENT DOCUMENTS

| 4,276,885 | 7/1981 | Tickner et al. | 128/660 |
|---|---|---|---|
| 5,632,277 | 5/1997 | Chapman et al. | 128/660.07 |
| 5,706,819 | 1/1998 | Hwang et al. | 128/662.02 |
| 5,833,613 | 11/1998 | Averkiou et al. | 600/440 |
| 5,984,869 | * 11/1999 | Chiao et al. | 600/437 |
| 6,074,348 | * 6/2000 | Chiao et al. | 600/443 |

OTHER PUBLICATIONS

Hein et al., "Current Time–Domain Methods for Assessing Tissue Motion by Analysis from Reflected Ultrasound Echoes –A Review," IEEE TRans. Ultrason., Ferroelec., Freq. Contr., vol. 40, No. 2, Mar. 1993, pp. 84–102.

de Jong et al., "Characteristics of Contrast Agents and 2D Imaging," 1996 IEEE Ultrasonics Symposium, pp. 1449–1458.

Ishihara et al., "Path Lines in Blood Flow Using High Speed Digital Subtraction Echography," Proc. 1992 IEEE Ultrason. Symp., pp. 1277–1280.

de Jong et al., "Principles and Recent Developments in Ultrasound Contrast Agents," vol. 29, 1991, pp. 324–330.

Ishihara et al., "High–Speed Digital Subtraction Echography: etc.," Proc. 1990 IEEE Ultrason. Symp., pp. 1473–1476.

(List continued on next page.)

Primary Examiner—Marvin M. Lateef
Assistant Examiner—Ali M. Imam
(74) Attorney, Agent, or Firm—Marvin Snyder; Douglas E. Stoner (57) ABSTRACT

In performing flow imaging using coded excitation and wall filtering, a coded sequence of broadband pulses (centered at a fundamental frequency) is transmitted multiple times to a particular transmit focal position, each coded sequence constituting one firing. On receive, the receive signals acquired for each firing are supplied to a finite impulse response filter which both compresses and bandpass filters the receive pulses, e.g., to isolate a compressed pulse centered at the fundamental frequency. The compressed and isolated signals are then high pass filtered across firings using a wall filter. The wall-filtered signals are used to image blood flow and contrast agents.

62 Claims, 5 Drawing Sheets

OTHER PUBLICATIONS

Averkiou et al., "A New Imaging Technique Based on the Nonlinear Properties of Tissue," Proc. 1997 IEEE Ultrason. Symp.

Uhlendorf, "Physics of Ultrasound Contrast Imaging: etc.," IEEE Trans. Ultrason. Ferroelec. & Freq. Control, vol. 41, No. 1, pp. 70–79, Jan. (1994).

Shahnazi et al., "Use of Contrast Agents in Ultrasound," Proc. 1994 IEEE Ultrason. Symp., pp. 85–87.

Wang et al., "Contrast Medium Assisted Fluid Flow Measurements," IEEE Trans. Ultrason. Ferroelec. & Freq. Control, vol. 42, No. 2, pp. 309–315, Mar. (1995).

* cited by examiner fig. 1 fig. 2 fig. 3 fig. 4 fig. 5 fig. 6

METHOD AND APPARATUS FOR FLOW IMAGING USING CODED EXCITATION

RELATED PATENT APPLICATIONS

This is a Continuation-in-Part of U.S. patent application Ser. No. 09/299,034 filed on Apr. 23, 1999, which is a Continuation-in-Part of U.S. patent application Ser. No. 09/065,212, filed Apr. 23, 1998, which is a continuation-in-Part of U.S. patent application Ser. No. 09/052,789, filed on Mar. 31, 1998, now abandoned. Each of the aforesaid U.S. Patent applications is hereby incorporated by reference.

FIELD OF THE INVENTION

This invention generally relates to ultrasound imaging systems. In particular, the invention relates to methods and apparatus for imaging blood flow and contrast agents.

BACKGROUND OF THE INVENTION

Conventional ultrasound scanners create two-dimensional B-mode images of tissue in which the brightness of a pixel is based on the intensity of the echo return. In a so-called "color flow" mode, the flow of blood or movement of tissue can be imaged. Conventional ultrasound flow imaging methods use either the Doppler principle or a time-domain cross-correlation method to estimate the average flow velocity, which is then displayed in color overlaid on a B-mode image.

Measurement of blood flow in the heart and vessels using the Doppler effect is well known. The frequency shift of backscattered ultrasound waves may be used to measure the velocity of the backscatterers from tissue or blood. The change or shift in backscattered frequency increases when blood flows toward the transducer and decreases when blood flows away from the transducer. The Doppler shift may be processed to estimate the average flow velocity, which is displayed using different colors to represent speed and direction of flow. The color flow velocity mode displays hundreds of adjacent sample volumes simultaneously, all color-coded to represent each sample volume's velocity.

Conventional ultrasound flow imaging displays either the average Doppler power ("power Doppler imaging") or the average flow velocity ("color flow velocity imaging") as a color overlay on a B-mode image. The transmitted pulses are typically more narrowband than B-mode pulses in order to gain Doppler sensitivity. Operating on a packet of as many as 16 transmits, a high-pass wall filter first rejects echoes from slower-moving tissue or vessel walls to reduce the signal dynamic range. The number of wall filter output samples per packet is given by (N−W+1), where N is packet size and W is wall filter length. Subsequently, the instantaneous Doppler power is computed as the magnitude squared of each wall filter quadrature output signal and the average of all quadrature output signals yields the average Doppler power. Alternatively, the average velocity is computed from the wall filter quadrature output signals based on the Doppler principle (phase change) or time delay between firings. The Kasai autocorrelation algorithm or a time-domain cross-correlation algorithm can be used to estimate the average flow velocity.

Although conventional color-flow imaging has very good flow sensitivity, the ability to see physical flow is limited by its limited dynamic range (which is partially dependent on the compression curve), limited resolution (due to narrow-band pulses), limited frame rate (due to large packet sizes), and axial-only flow sensitivity (which is dictated by the reliance on the Doppler effect). In addition, conventional color-flow imaging suffers from artifacts such as aliasing, color blooming and bleeding.

Digital subtraction methods have been previously proposed to image moving reflectors in B-mode imaging (see Ishihara et al., "Path Lines in Blood Flow Using High-Speed Digital Subtraction Echography," Proc. 1992 IEEE Ultrason. Symp., pp. 1277–1280, and Ishihara et al., "High-Speed Digital Subtraction Echography: Principle and Preliminary Application to Arteriosclerosis, Arrhythmia and Blood Flow Visualization," Proc. 1990 IEEE Ultrason. Symp., pp. 1473–1476). These methods use frame-to-frame subtraction, which is essentially a two-tap wall filter with an extremely low cutoff frequency. The low cutoff frequency is due to the long time delay between adjacent frames, which does not adequately suppress signals from slow-moving tissue or vessel walls.

Conventional ultrasound images are formed from a combination of fundamental and harmonic signal components, the latter of which are generated in a nonlinear medium such as tissue or a blood stream containing contrast agents. In certain instances ultrasound images may be improved by suppressing the fundamental and emphasizing the harmonic signal components.

Contrast agents have been developed for medical ultrasound to aid in diagnosis of traditionally difficult-to-image vascular anatomy. For example, the use of contrast agents is discussed by de Jong et al. in "Principles and Recent Developments in Ultrasound Contrast Agents," Ultrasonics, Vol. 29, pp. 324–380 (1991). The agents, which are typically microbubbles whose diameter is in the range of 1–10 micrometers, are injected into the blood stream. Since the backscatter signal of the microbubbles is much larger than that of blood cells, the microbubbles are used as markers to allow imaging of blood flow. One method to further isolate echoes from these agents is to use the (sub)harmonic components of the contrast echo, which is much larger than the harmonic components of the surrounding tissue without contrast agent. [See, e.g., Newhouse et al., "Second Harmonic Doppler Ultrasound Blood Perfusion Measurement," Proc. 1992 IEEE Ultrason. Symp., pp. 1175–1177; and Burns, et al., "Harmonic Power Mode Doppler Using Microbubble Contrast Agents: An Improved Method for Small Vessel Flow Imaging," Proc. 1994 IEEE Ultrason. Symp., pp. 1547–1550.] Contrast imaging of (sub)harmonic signals has largely been performed by transmitting a narrowband signal at frequency $f_0$ and receiving at a band centered at frequency $2f_0$ (second harmonic) or at frequency $f_0/2$ (subharmonic) followed by conventional color flow processing. This approach has all the limitations of a conventional color flow system, namely, low resolution, low frame rate and flow sensitivity only in the axial direction.

In medical diagnostic ultrasound imaging, it is also desirable to optimize the signal-to-noise ratio (SNR). Additional SNR can be used to obtain increased penetration at a given imaging frequency or to improve resolution by facilitating ultrasonic imaging at a higher frequency. Coded excitation is a well-known radar technique used to increase signal-to-noise ratio in situations where the peak power of a transmitted signal cannot be increased but the average power can. This is often the situation in medical ultrasound imaging, where system design limitations dictate the peak amplitude of the signal driving the transducer. In this situation, longer signals, such as chirps, can be used to deliver higher average power values, and temporal resolution is restored by correlating the return signal with a matched filter. Chirps, however, are expensive to implement on a phased array ultrasound system due to the complexity of the electronics, so binary codes, or codes that can be easily represented digitally as a series of digits of +1, −1 or 0, are much more practical. Binary codes are also preferred because they contain the most energy for a given peak amplitude and pulse duration.

Thus, there is a need for a method of visualizing physical flow by directly imaging moving reflectors. This requires the imaging system to have high SNR/dynamic range, high resolution, high frame rate, ability to reject clutter from stationary or slower-moving tissue and vessel walls, and flow sensitivity in all directions.

SUMMARY OF THE INVENTION

A method and apparatus for imaging blood flow with high resolution, high frame rate, high SNR/dynamic range and flow sensitivity in all directions achieves clinical benefits including clear visualization of complex hemodynamics, residual lumen in stenosis and thrombus motion. High resolution is achieved by using broadband pulses, while high frame rate is achieved by using small packet sizes. High SNR/dynamic range is maintained by using coded excitation. Flow sensitivity in the range direction is highest and arises from pulse-to-pulse RF decorrelation, while flow sensitivity in the cross-range direction is due to pulse-to-pulse amplitude decorrelation as a group of reflectors (e.g. blood or contrast agents) flows across the beam profile.

In the method disclosed herein, a small packet of coded broadband pulses is transmitted with a given pulse repetition interval to a transmit focal position. The backscattered signals from this sequence of firings are filtered in slow time to remove echoes from stationary or slower-moving reflectors along the transmit path. The packet size is small (under six firings) to achieve high frame rate, though with the undesirable side effect of reduced SNR. In the preferred embodiment, SNR is recovered by using coded excitation. The slow-time filtering is preferably performed by a high-pass FIR (finite impulse response) or IIR (infinite impulse response) wall filter. The wall filter increases the flow signal-to-clutter ratio, which may be further increased by administering a contrast agent to the patient prior to imaging. A flow image is formed by scanning the transmit focal position across the region of interest. In one preferred embodiment, the scan direction is opposite that of the flow direction for maximum apparent resolution and flow sensitivity. Frame rate may be increased by simultaneously processing more than one receive vector from a single transmit vector with parallel receive hardware. The packet size, pulse repetition interval (PRI) and region of interest (ROI) may be controlled by the user.

In accordance with a preferred embodiment of the invention, a coded sequence of broadband pulses (centered at a fundamental frequency) is transmitted multiple times to a particular transmit focal position, each coded sequence constituting one firing. On receive, the receive pulses acquired for each firing are compressed and bandpass filtered, e.g., to isolate a compressed pulse centered at the fundamental frequency. The compressed and isolated signals are then high pass filtered across firings using a wall filter. The wall-filtered signals are used to image blood flow without injecting contrast agents into the blood.

In accordance with another preferred embodiment of the invention, contrast agents such as gas-filled microbubbles are injected into the blood to serve as markers for imaging blood flow. As in the previously described embodiment, a coded sequence of broadband pulses is transmitted multiple times to a particular transmit focal position. Fundamental and (sub)harmonic signals are generated from interaction between the transmitted ultrasound pulses and the propagation medium, especially the injected contrast agents. On receive, the receive signals are decoded and bandpass filtered to isolate the fundamental signals. The isolated fundamental signals are then high-pass filtered across firings using a wall filter. As a result of this filtering, fundamental signals reflected from non-stationary tissue or flow regions along the transmit path can be extracted. The resulting flow signals can be superimposed on, or summed with, a conventional B-mode imaging data vector and displayed. Received energy at the fundamental frequency which would have contributed to undesirable stationary tissue signal is suppressed by the wall filter.

In accordance with further preferred embodiments of the invention, the flow image may be combined with a stationary tissue (i.e., B-mode) image acquired by detecting either the fundamental or (sub)harmonic signal components, either by summation or as an overlay in order to provide anatomical landmarks. An advantage of the overlay is that it may be done in color so that the flow regions stand out clearly. However, this method requires more complex display hardware and additional firings (to acquire imaging data representing stationary tissue) beyond those used for flow imaging. Furthermore, the flash artifacts are severe. Injection of the background B-mode image by summation (either coherent or incoherent) results in more benign flash artifacts. By using a wall filter feedthrough method, a B-mode image may be added with (for a harmonic B-mode image) or without (for a fundamental B-mode image) additional firings. When separate firings are used for the flow mode and the B mode, the firings are interleaved and the flow signals may be thresholded separately from the B-mode signals prior to display.

The method of the invention differs from both conventional power Doppler and color flow velocity imaging in several respects. For example, the inventive method does not extract the Doppler signal and so is able to use broadband pulses. Also, the inventive method does not require either baseband data (although it can use baseband data) or velocity estimation. Additionally, the summation method of providing a B-mode background is simpler (less display hardware is required), more efficient (the feedthrough method does not require additional transmits to acquire a fundamental B-mode image), and more effective (more benign flash artifacts) than the conventional overlay method.

DETAILED DESCRIPTION OF THE PREFERRED EMBODIMENTS

Figure 1:
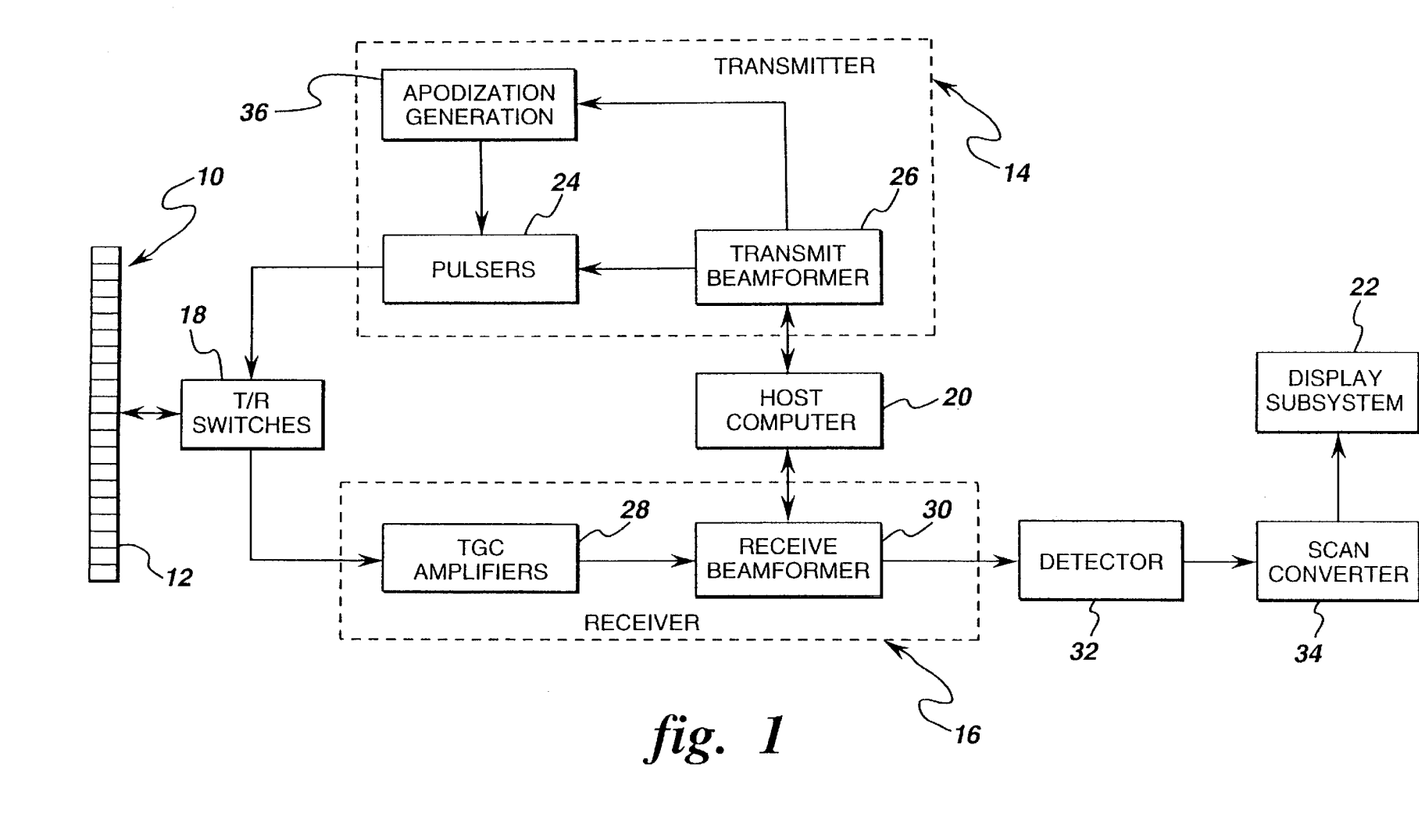
FIG. 1 is a block diagram generally depicting various subsystems of a conventional ultrasound imaging system.

A conventional ultrasonic imaging system is depicted in FIG. 1. The system comprises a transducer array 10 having a plurality of separately driven transducer elements 12, each of which produces a burst of ultrasonic energy when energized by a pulsed waveform produced by a transmitter 14. The ultrasonic energy reflected back to transducer array 10 from the object under study is converted to an analog electrical signal by each receiving transducer element 12 and applied separately to a receiver 16 through a set of transmit/receive (T/R) switches 18. Transmitter 14 and receiver 16 are operated under control of a host computer or master controller 20 responsive to commands supplied by a human operator via an operator interface (not shown). A complete scan is performed by acquiring a series of echoes in which transmitter 14 is gated ON momentarily to energize each transducer element 12, and the subsequent echo signals produced by each transducer element 12 are applied to receiver 16. Receiver 16 converts the analog echo signals to digital signals and combines the respective digital signals derived from each transducer element to produce a single beamsummed signal which is used to produce a line in an image displayed by a display subsystem 22.

Under the direction of host computer 20, transmitter 14 drives transducer array 10 such that the ultrasonic energy is transmitted as a directed focused beam. To accomplish this, respective time delays are imparted to a multiplicity of pulsers 24 by a transmit beamformer 26. Host computer 20 determines the conditions under which the acoustic pulses will be transmitted. With this information, transmit beamformer 26 determines the timing and amplitudes of each of the transmit pulses to be generated by pulsers 24. The amplitudes of each transmit pulse are generated by an apodization generation circuit 36, such as a high-voltage controller that sets the power supply voltage to each pulser. Pulsers 24 in turn send the transmit pulses to each of elements 12 of transducer array 10 via T/R switches 18, which protect time-gain compensation (TGC) amplifiers 28 from the high voltages which may exist at the transducer array. The apodization weightings are selected to achieve optimal compromise between transmit power and sidelobe level. Weightings are generated by apodization generation circuit 36, which may comprise a set of digital-to-analog converters that take the weighting data from transmit beamformer 26 and apply it to pulsers 24. By appropriately adjusting the transmit focus time delays in a conventional manner and also adjusting the transmit apodization weightings, a multiplicity of ultrasonic waves transmitted by individual transducer elements can be combined to form a directed and focused transmit beam. The apodization weightings and the transmit focus time delays may be set by the host computer based on system programming and operator inputs.

Each burst of ultrasonic energy is reflected from objects located at successive ranges along each transmit beam. The resulting echo signals are sensed separately by each transducer element 12 and a sample of the echo signal magnitude at a particular point in time represents the amount of reflection occurring at a specific range. Due to the differences in the propagation paths between a reflecting point and each transducer element 12, the echo signals are not detected simultaneously and their amplitudes are not equal. Receiver 16 amplifies the separate echo signals via a respective TGC amplifier 28 in each receive channel. TGC is carried out by increasing or decreasing gain as a function of depth. The amount of amplification provided by the TGC amplifiers is controlled by a TGC circuit (not shown), which is set by the host computer and manual operation of potentiometers. The amplified echo signals are then fed to a receive beamformer 30.

Under the direction of host computer 20, receive beamformer 30 tracks the direction of the transmitted beam. Receive beamformer 30 imparts the proper time delays and receive apodization weightings to each amplified echo signal and sums these signals to provide an echo signal which accurately represents the total ultrasonic energy reflected from a point located at a particular range in a particular transmit direction. The receive focus time delays are computed in real-time using specialized hardware, or are read from a lookup table. The receive channels also have circuitry for filtering the received pulses. The receive apodization weightings and receive focus time delays may be set by the host computer based on system programming and operator inputs.

The time-delayed receive signals are then summed and provided to a signal processor or detector 32 which converts the summed receive signals to display data. In the typical gray-scale display, the display data are the envelope of the signal with some additional processing, such as edge enhancement and logarithmic compression. For RF data, the envelope can be detected using a low-pass filter; for baseband data, the envelope can be detected using an envelope detector which produces a signal representing $(I^2+Q^2)^{1/2}$, where I is the in-phase signal component and Q is the quadrature signal component of the baseband data.

Scan converter 34 receives the display data from detector 32 and converts the data into the desired image for display. In particular, scan converter 34 converts the acoustic image data from polar coordinate (R-θ) sector format or Cartesian coordinate linear array to appropriately scaled Cartesian coordinate display pixel data at the Video rate. The scan-converted acoustic data are then provided for display by display subsystem 22, which images the time-varying amplitude of the envelope of the signal as a gray scale. A respective scan line is displayed for each transmit beam.

Figure 2:
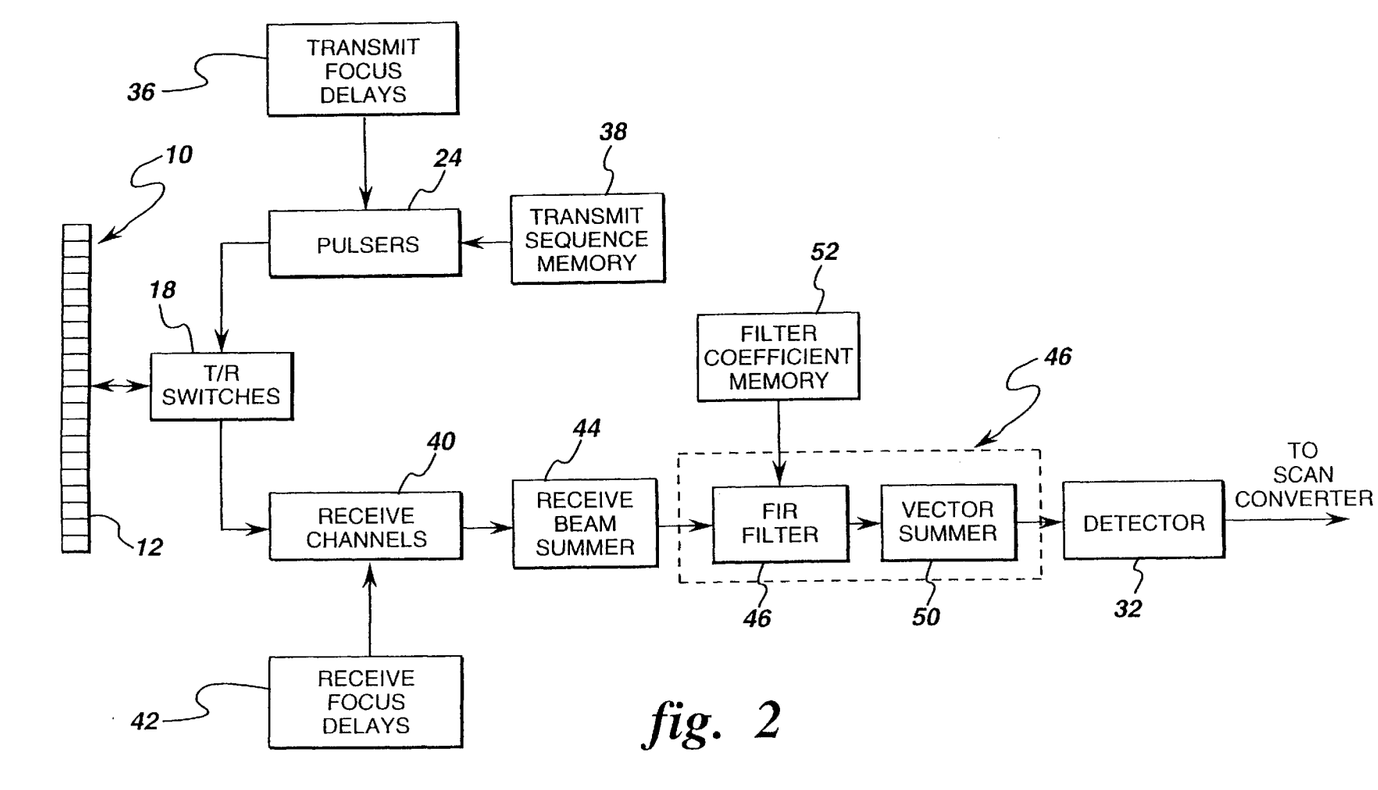
FIG. 2 is a block diagram showing an ultrasound imaging system in accordance with one preferred embodiment of the invention.

FIG. 2 shows an ultrasound flow imaging system in accordance with one preferred embodiment of the invention. Each transducer element in the transmit aperture is pulsed N times (where N is preferably 6 or less) using the same coded waveform by supplying the same transmit sequence from a memory 38 into each pulser N times. Pulsers 24 drive elements 12 of transducer array 10 such that the ultrasonic energy produced is directed or steered in a beam for each transmit firing. To accomplish this, transmit focus time delays 36 are imparted to the respective pulsed waveforms produced by the pursers in response to the transmit sequence from memory 38. By appropriately adjusting the transmit focus time delays in a conventional manner, the ultrasonic beam can be focused at a desired transmit focal position. The N pulses are transmitted to the transmit focal position with a specified pulse repetition interval (PRI). The transmit sequences are supplied by the host computer based on system programming and operator inputs.

The basic concept of the single-transmit coded excitation comprises modulating a specially designed code sequence based on a transmit burst (base sequence) of length P. A coded pulse sequence of n bursts is often referred to as an n-chip code. The coded pulse sequence, which has a length nxP, enables a larger acoustic dosage or a shorter base sequence to be used to interrogate the flowing blood. The output signal of the decoding (i.e., compression) filter is a compressed signal pulse of length equal, or close to, the original transmit burst length P, but whose amplitude is that produced by the n-times-longer coded pulse sequence. This coding technique has no adverse effects on frame rate and has much less chance of improper decoding due to high velocities or adaptive rotation.

Figure 3:
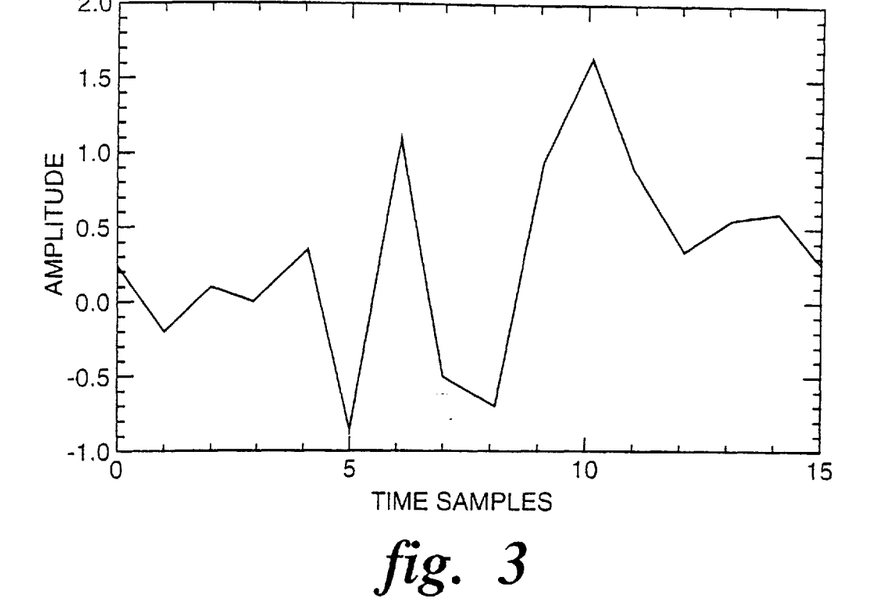
FIG. 3 is a graph showing the filter coefficients of a 16-tap mismatched filter suitable for use with non-Barker single-transmit coded excitation [1,1,1,−1,−1,1,−1,1] in accordance with one example of a preferred embodiment of the invention.
Figure 4:
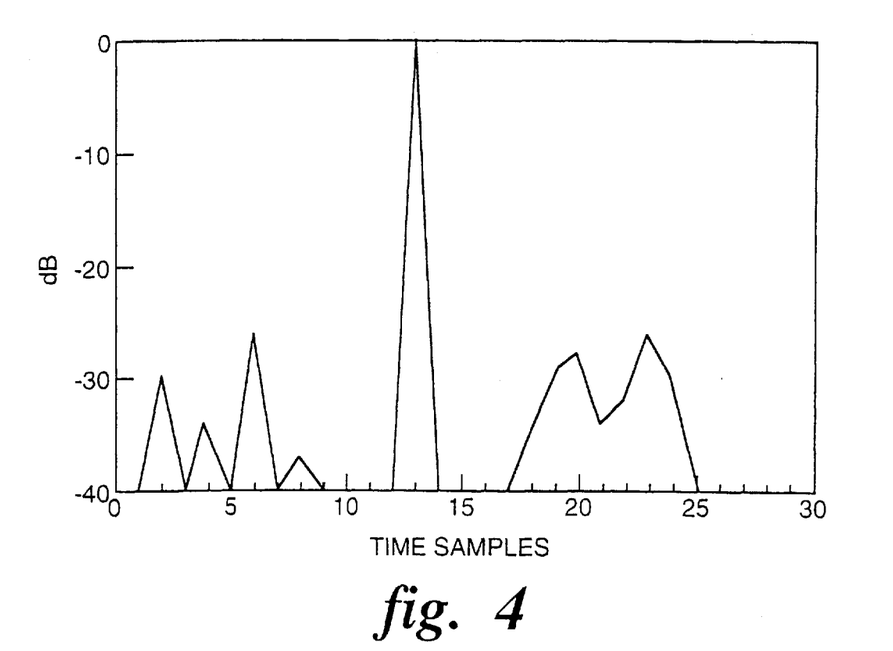
FIG. 4 is a graph showing the decoded signal produced by the 16-tap mismatched filter depicted in FIG. 5 when its filter coefficients are convolved with the code [1,1,1,−1,−1, 1,−1,1].

A single coded waveform is transmitted and the received waveform is convolved with the decoding filter impulse response to compress the waveform energy into a small time interval. The decoding filter may be a matched filter (wherein the filter coefficients are the same as the transmit code) or a mismatched filter. The mismatched filter is designed to minimize the sum of squares error between the filter output signal (with the code sequence as input signal) and a Kronecker delta function. Preferred single-transmit codes include Barker codes and non-Barker codes such as the length-8 code [1,1,1,−1,1,−1,−1,1]. When this code is convolved with the length-16 mismatched filter shown in FIG. 3, the output signal is as shown in FIG. 4.

For each transmit, the echo signals from transducer elements 12 are fed to respective receive channels 40 of the receive beamformer. Under the direction of host computer 20 (FIG. 1), the receive beamformer tracks the direction of the transmitted beam. The receive beamformer imparts the proper receive focus time delays 42 to the received echo signal and sums the echo signals to provide a composite echo signal which accurately represents the total ultrasonic energy reflected from a particular position along a transmit beam. The time-delayed receive signals are summed in a receive summer 44 for each of the N transmit firings focused at a particular transmit focal position.

The summed receive signals for successive transmit firings are supplied to a filter 46 which performs the functions of decoding, bandpass filtering and wall filtering. This is accomplished by proper selection of the filter coefficients by the host computer based on system programming and operator inputs. Filter 46 filters across the N transmit firings and supplies a filtered signal to detector 32 which forms the envelope of the firing-to-firing filtered signal. After post-processing (including edge enhancement and logarithmic compression) and scan conversion, a scan line is displayed by display subsystem 22 (FIG. 1). This procedure is repeated so that a respective scan line is displayed for each transmit focal position (in the situation of one transmit focal position for each beam angle) or for each vector (in the situation of multiple transmit focal positions for each beam angle).

In accordance with a preferred embodiment of the invention, filter 46 comprises an FIR filter 48 having an input coupled to the output of receive summer 44; and a vector summer 50 having an input coupled to FIR filter 48 and an output coupled to detector 32. The FIR filter has M filter taps for receipt of a respective set of M filter coefficients for each transmit firing. The filter coefficients for the n-th transmit firing are $a_n c_1, a_n c_2, \ldots, a_n c_M$, where $a_n$ is the scalar weighting for the n-th transmit firing, n=1, 2, . . . , N, and where $c_1, c_2, \ldots, c_M$ is a set of filter coefficients selected so that FIR filter 48 both compresses the receive pulses and passes a major fraction of the desired fundamental frequency band. In particular, filter coefficients $c_1, c_2, \ldots, c_M$ are obtained by convolving a first set of filter coefficients $b_1, b_2, \ldots, b_P$ which are a function of the frequency band to be passed, with a second set of filter coefficients $d_1, d_2, \ldots, d_Q$, which are either matched or mismatched filter coefficients, where M=(P+Q−1). The scalar weightings $a_1, a_2, \ldots, a_N$ form a "wall" filter in slow time which selectively passes signals from reflectors moving at a velocity greater than a predetermined threshold, i.e., the slow-time filter coefficients are chosen to reject low frequencies which correspond to motion at lower speeds. The successive FIR filter output signals for the N transmit firings are coherently accumulated in vector summer 50. This is equivalent to a wall filter with a single output signal sample. The output signal of the vector summer then undergoes envelope detection, post-processing, scan conversion and display in a known manner.

The filter coefficients $a_n c_1, a_n c_2, \ldots, a_n c_M$ are provided to filter 48 for each transmit firing by the host computer from a filter coefficient memory 52. For example, for the first transmit firing, the set of filter coefficients $a_1 c_1, a_1 c_2, \ldots, a_1 c_M$ is supplied to FIR filter 48; for the second transmit firing, the set of filter coefficients $a_2 c_1, a_2 c_2, \ldots, a_2 c_M$ is supplied to the FIR filter; and so forth. The filter coefficients are programmable, depending upon the diagnostic application. Different sets of filter coefficients can be stored in lookup tables in the memory of the host computer and the desired set of coefficients can be selectable by the system operator. For applications where the number of transmit firings N=2, pairs of sets of filter coefficients are stored in memory, one set of filter coefficients of a selected pair being transferred to the FIR filter before the first transmit firing and the other set of filter coefficients of the selected pair being transferred to the FIR filter after the first transmit firing and before the second transmit firing. Similarly, for applications where the number of transmit firings N=3, two or three sets of filter coefficients are stored in memory for use in filtering the receive signals resulting from the first through third firings. A similar procedure is followed for applications where the number of transmit firings N>3.

The time interval between each of the N transmits per focal position is user controllable to determine the "slow-time" filter cutoff frequency. A longer interval between each of the N transmits to a particular focal position results in a lower cutoff frequency with higher sensitivity to low velocity flow.

The flow image may be displayed by itself for maximum flow contrast, or may be summed with a B-mode background image. Superimposition of the flow image on a conventional B-mode image allows the diagnostician to observe the flow of blood relative to known anatomical landmarks during medical diagnosis. The flash artifact seen in this summation of flow and B-mode images is more benign than that found in conventional color-flow imaging.

Figure 5:
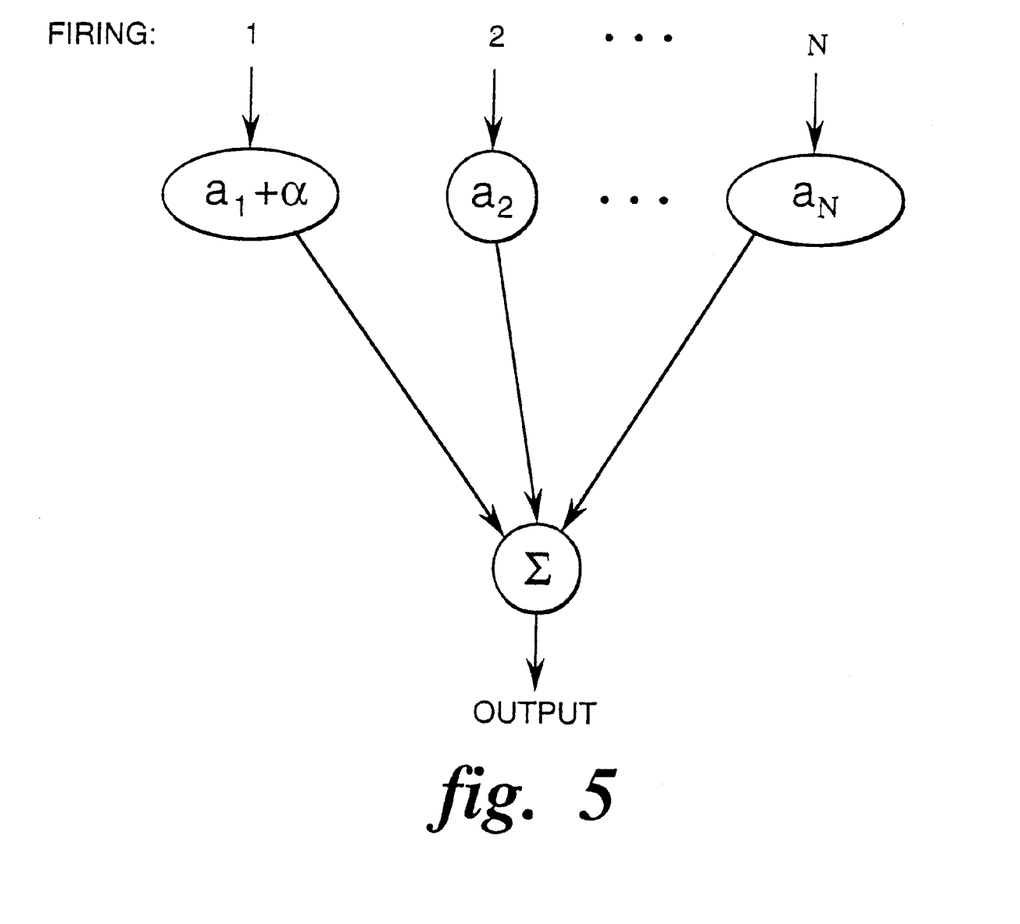
FIG. 5 is a flowchart showing "slow-time" wall filtering with feedthrough of B-mode signal in accordance with preferred embodiments of the invention.

In one preferred embodiment, a B-mode image derived from the fundamental frequency band is summed with the flow image. This is achieved by perturbing one of the "slow-time" filter weightings so that a fundamental B-mode signal component is passed or fed through the wall filter. For example, the weighting $a_1$ for the first transmit firing (or for any other transmit firing) can be perturbed by an amount $\alpha$, as shown in FIG. 5. The B-mode feedthrough allows the flow image to be superimposed on a conventional B-mode image for display. Alternatively, the flow image may be superimposed in color on a conventional B-mode image for display. This feedthrough technique is one way of obtaining the B-mode background image without additional firings. Other ways of obtaining a B-mode background image include transmitting pulses specifically for the B-mode image (this method is required for an ROI) and transmitting pulses that are slightly different from each other within a packet such that the wall filter output signal is not zero, even with everything stationary.

In alternative preferred embodiments, the background B-mode image may also be a (sub)harmonic image, which helps to clear up certain image artifacts such as reverberations and out-of-plane acoustic "noise" which may obscure flow imaging. This can be achieved in any one of several ways.

In one preferred embodiment for producing a harmonic B-mode background image, an additional uncoded pulse is transmitted at $f_0$ (usually the transducer lower frequency band edge) with echoes filtered by a bandpass filter (incorporated in FIR filter 48 shown in FIG. 2) centered at frequency $2f_0$ (second harmonic) or frequency $f_0/2$ (subharmonic). This uncoded transmit is followed by at least two coded transmits as previously described. The receive signals for all of these transmits are slow-time filtered by the wall filter. Where one uncoded transmit is followed by two coded transmits, the wall filter scalar weightings $[a_0,a_1,a_2]=[1,1,-1]$. The order in which the coded and uncoded transmits are transmitted can be changed so that the uncoded transmit is in the middle or at the end. Such an arrangement has the effect of passing the harmonic B-mode background image vector through while subtracting one flow image vector from the other.

In another preferred embodiment for producing a harmonic B-mode background image, an even number of uncoded pulses are transmitted in succession, followed by at least two coded pulses. Every other uncoded pulse in the transmit packet may be negated, such that the echoes from the negated uncoded pulses are added to the echoes from the positive uncoded pulses to cancel the fundamental signal and leave the harmonic signal. Subsequently, the harmonic signal is added to the flow signal either before (coherent) or after (incoherent) detection. For example, the transmit packet may consist of two uncoded pulses and at least two coded pulses, the first uncoded pulse having positive polarity and the second uncoded pulse having negative polarity. The receive signals for all of these transmits are then slow-time filtered by the wall filter. Where two uncoded transmits of opposite polarity are followed by two coded transmits, the wall filter scalar weightings $[a_0,a_1,a_2,a_3]=[1,1,1,-1]$. The order in which the coded and uncoded transmits are transmitted can be permutated. This arrangement has the effect of passing the harmonic B-mode background image vector through the wall filter while subtracting one flow image vector from the other.

In alternative preferred embodiments of the invention, SNR is recovered using two-transmit coded excitation, e.g., Golay code pairs. In particular, the SNR is improved by transmitting a pair of Golay-encoded base sequences consecutively on each beam at the same focal position and then decoding the beamsummed data. A pair of Golay-encoded base sequences are formed by convolving a base sequence with a Golay code pair after oversampling. A Golay code pair is a pair of binary (+1, −1) sequences with the property that the sum of the autocorrelations of the two sequences is a Kronecker delta function. An oversampled Golay sequence is the Golay sequence with zeroes between each +1 and −1, the number of zeroes being greater than or equal to the length of the base sequence minus one. Golay codes have no range sidelobes. For each firing, decoding is performed using the oversampled Golay sequence corresponding to the Golay-encoded base sequence employed during transmission. By transmitting two sequences of pulses that are polarity-encoded according to a Golay pair, correlation of each of the received beamsum signals with its corresponding oversampled Golay sequence and the summation of those correlations enables an increase in the SNR with virtually no degradation in image resolution or contrast. In practice, range sidelobes do occur due to code distortion, but tend to be below the noise floor and do not adversely affect image quality. Tissue motion that occurs between transmission of the two sequences of the Golay pair also causes code distortion, which increases the range sidelobes. By transmitting the second sequence as soon as the echoes from the first sequence are completely received, the time interval between the two transmits can be minimized. Minimization of the interval between transmits minimizes the motion-induced code distortion.

Figure 6:
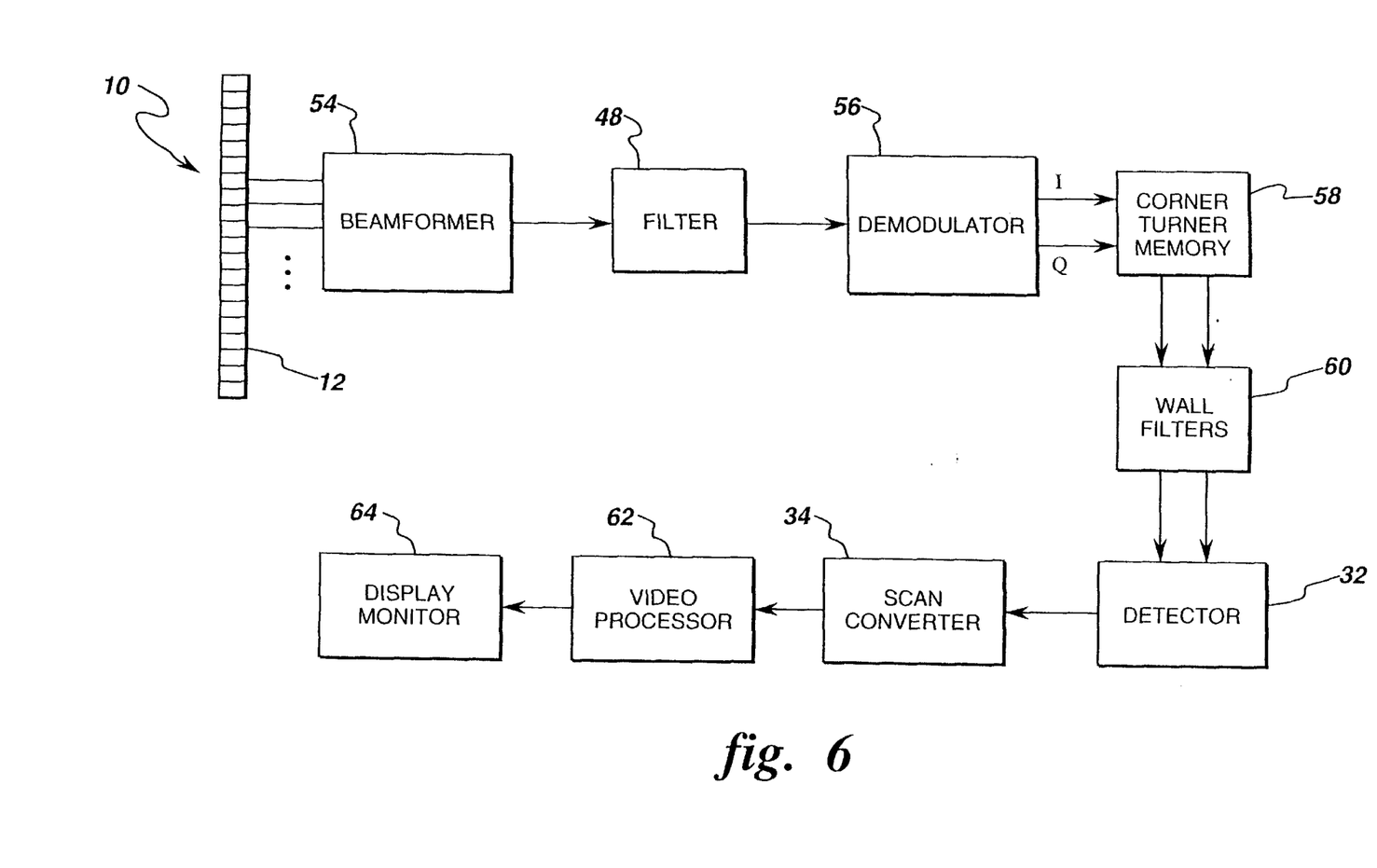
FIG. 6 is a block diagram showing an ultrasound imaging system in accordance with another preferred embodiment of the invention.

The ultrasound imaging system shown in FIG. 2 employs complementary code processing. Thus, instead of transmitting a packet consisting of N transmit pulses (e.g., each pulse being a tone burst), a packet is transmitted consisting of 2N transmit pulses, successive transmit pulses being alternatingly encoded with the respective codes of the complementary (e.g., Golay) code pair to form alternating coded pulse sequences A and B. For example, coded pulse sequence A may be formed by coding a sequence of M transmit pulses with a first M-digit transmit code and coding another sequence of M transmit pulses with a second M-digit transmit code, wherein the first and second transmit codes are complementary. Autocorrelation is achieved for each transmit firing by loading the decoding filter with a receive code equal to the transmit code for that firing and filtering the received signals. The autocorrelated sequences are then summed using the wall filter, e.g., with the scalar weightings for every odd-numbered pair of transmits being the negative of the scalar weightings for every even-numbered pair of transmits. In accordance with a preferred embodiment shown in FIG. 6, the transmitter (not shown) in a beamformer 54 fires a packet of complementary-coded pulse sequences A and B in alternating sequence, i.e., A B A B . . . The receive signals resulting from this packet can be designated as:

$A_1\ B_1\ A_2\ B_2\ A_3\ B_3\ \ldots\ A_N\ B_N$ where $A_i$ is the receive signal for the i-th firing of code A, $B_i$ is the receive signal for the i-th firing of code B, which is the complement of code A, and 2N is the number of firings in a packet. These receive signals are compressed and bandpass filtered by filter 48. In the instance of an RF (radio frequency) beamformer output signal, a demodulator 56 transforms the compressed RF signal into its I and Q components and loads the I and Q components into a corner turner memory 58. A (1,1,−1,−1) wall filter 60 is applied to each down range position across firings, i.e., in "slow time", filtering each range point to produce the respective difference signals:

$$(A_1 + B_1) - (A_2 + B_2)$$

$$(B_1 + B_2) - (B_2 + A_3)$$

$$(A_2 + B_2) - (A_3 + B_3)$$

$$(B_2 + A_3) - (B_3 + A_4)$$

$$\vdots$$

$$(A_{N-1} + B_{N-1}) - (A_N + B_N)$$

(parentheses have been inserted to make the mathematics more obvious). Thus, adjacent complementary code sequences are added together, and the resulting sums are wall-filtered. The wall filter output signal is envelope detected by detector 32, scan converted by scan converter 34, color mapped by a video processor 62 and displayed on a display monitor 64. Wall filter 60 generally allows (N−W+1) signal samples to be produced, where N is the packet size and W is the wall filter length. The wall filter for the implementation shown in FIG. 2 corresponds to N=W. Besides using wideband pulses and small packet sizes, the compression curves and display maps are selected to provide a greater number of effective display bits. The vector density is increased to increase resolution. The flow image is displayed as a color overlay (with selectable color maps loaded into video processor 62) on a B-mode image.

In the embodiment of FIG. 6, even though two coded pulse sequences are required for each transmit firing, the staggering of the coded pulse sequences allows the total number of firings in the packet to be increased only by the number of additional wall filter taps for the equivalent number of points supplied to the flow detector, and not by a factor of two. Frame rates can thus be kept sufficiently high by using relatively short wall filters. This implementation also maintains the original velocity dynamic range of ±PRF/2, where PRF is the frequency at which the individual coded pulse sequences A or B are fired, not the frequency at which the pairs of complementary-coded pulse sequences are fired.

When using a single-transmit code, the invention requires at least two transmits of the code, with the resulting echoes being "slow-time" filtered by the wall filter. In contrast, using Golay codes, acquisition of two data points at different times requires four transmits, two for each Golay code of the Golay code pair. Therefore, use of two-transmit codes requires at least four coded transmits. During wall filtering, the same set of scalar weightings are applied to the echoes of both Golay codes of the Golay code pair. Additional uncoded transmits can be included in the packet to acquire a harmonic B-mode background image, as previously described.

In the embodiments based on FIG. 2, the decoding filter, bandpass filter and wall filter are combined in an FIR filter dynamically supplied with appropriate filter coefficients and a vector summer. Alternatively, separate filters could be used. In the embodiment shown in FIG. 6, the decoding filter and bandpass filter are combined in an FIR filter while the wall filter is separate. It should also be appreciated that either of the embodiments depicted in FIGS. 2 and 6 can be employed with either single-transmit or multiple-transmit coded excitation.

The frame rate for both the FIGS. 2 and 6 implementations may be increased by using parallel receive hardware to simultaneously process more than one receive vector from a single transmit vector by using parallel receive hardware. The packet size, pulse repetition interval (PRI), and region of interest (ROI) may be controlled by the user. The PRI determines the wall filter cut-off frequency and a larger PRI results in a lower cutoff frequency with higher sensitivity to low velocity flow. When the background B-mode image is generated from firings separate from those used to generate the flow image (i.e., not feedthrough), the separate B-mode firings may be interleaved with the flow firings to increase frame rate, and the flow image may be thresholded separately from the B-mode image.

In a preferred embodiment, the scan direction of the ultrasound beam is opposite that of the blood flow direction, thereby providing greater apparent flow sensitivity (more uniform fill-out to vessel edge) and greater resolution (smaller scatterer sizes). The scan direction is changed by user control either electronically or by manually turning the probe around.

One way to significantly increase the flow contrast (i.e., visibility from background) is to use contrast agents in the fundamental mode. Contrast agents are typically encapsulated gas microbubbles between 0.1 and 10 microns in diameter. When introduced into the body through injection, contrast agents serve as high-reflectivity markers for blood flow and perfusion. Ultrasound energy incident on the microbubbles is strongly reflected at the incident (fundamental) frequencies and at resonant (harmonic and subharmonic) frequencies, such that both fundamental and harmonic imaging techniques are used to image contrast agent. The preferred method uses the fundamental and not harmonic frequencies within the contrast echoes. Multiple firings of identical pulses are transmitted to a particular transmit focal position in succession. Specifically, N coded pulses centered at a fundamental frequency $f_0$ are transmitted to each transmit focal position. On receive, an FIR filter centered at the fundamental frequency compresses the received pulses and substantially isolates the desired fundamental component. Subsequently a wall filter extracts the fundamental flow signal over the N transmits.

While only certain preferred features of the invention have been illustrated and described, many modifications and changes will occur to those skilled in the art. For example, the invention is not limited to using biphase codes; polyphase codes can also be used. It is, therefore, to be understood that the appended claims are intended to cover all such modifications and changes as fall within the true spirit of the invention.

What is claimed is:

1. An imaging system comprising:
   a transducer array having a multiplicity of transducer elements for transmitting wave energy centered at a fundamental frequency in response to electrical activation and for transducing returned wave energy into electrical signals;
   a transmitter coupled to said transducer array and programmed to activate a plurality of said transducer elements to transmit focused wave energy encoded with a transmit code during first and second transmit events;
   a receiver programmed to respectively form first and second receive signals from electrical signals produced by said plurality of transducer elements subsequent to said first and second transmit events respectively;
   a wall filter programmed with first and second sets of filter coefficients to compress and bandpass first and second fundamental signal components of said first and second receive signals respectively and selectively pass frequencies corresponding to wave energy reflectors moving at a velocity above a predetermined threshold, the wall filter forming a flow signal derived at least in part from the compressed and bandpassed first and second fundamental signal components and the selectively passed frequencies; and
   a subsystem for displaying an image having an image portion which is a function of at least said flow signal.

2. The system as recited in claim 1, wherein said second set of filter coefficients are the negative of said first set of filter coefficients.

3. The system as recited in claim 1, wherein all but at least one of said second set of filter coefficients are the negative of said first set of filter coefficients, said at least one of said filter coefficients being perturbed to allow B-mode fundamental signal feedthrough.

4. The system as recited in claim 1, wherein said wall filter comprises an FIR filter and a vector summer coupled to said FIR filter.

5. The system as recited in claim 1, wherein said transmit code contains n digits and the number of filter coefficients in each of said first and second sets is greater than or equal to n.

6. The system as recited in claim 1, wherein said transmit code comprises a Barker code.

7. The system as recited in claim 1, wherein said transmit code is [1,1,1,−1,1,−1,−1,1].

8. The system as recited in claim 1, wherein said transmitter is further programmed to activate a plurality of said transducer elements to transmit focused wave energy which is uncoded during a third transmit event, said receiver is further programmed to form a third receive signal from electrical signals produced by said plurality of transducer elements subsequent to said third transmit event, and said wall filter is further programmed with a third set of filter coefficients to bandpass a harmonic signal component of said third receive signal for summing with said flow signal for display.

9. The system as recited in claim 1, wherein said transmitter is further programmed to activate a plurality of said transducer elements to transmit focused wave energy which is uncoded during third and fourth transmit events, said uncoded focused wave energy of said third transmit event being of opposite polarity to said uncoded focused wave energy of said fourth transmit event, said receiver is further programmed to form third and fourth receive signals from electrical signals produced by said plurality of transducer elements subsequent to said third and fourth transmit events respectively, and said wall filter is further programmed with third and fourth sets of filter coefficients to bandpass respective harmonic signal components of said third and fourth receive signals for summing with said flow signal for display while substantially canceling respective fundamental signal components of said third and fourth receive signals.

10. The system as recited in claim 1, wherein said subsystem comprises:

a processing subsystem for forming a flow image signal from said flow signal; and a display subsystem programmed to display said image portion as a function of said flow image signal.

11. The system as recited in claim 1, wherein said transducer elements comprise piezoelectric elements for transmitting ultrasound waves in response to electrical activation and for transducing returned ultrasound waves into electrical signals.

12. An imaging system comprising:

a transducer array having a multiplicity of transducer elements for transmitting wave energy centered at a fundamental frequency in response to electrical activation and for transducing returned wave energy into electrical signals;

a transmitter coupled to said transducer array and programmed to activate a plurality of said transducer elements to transmit focused wave energy encoded with a first Golay code of a Golay code pair during first and third transmit events and transmit focused wave energy encoded with a second Golay code of said Golay code pair during second and fourth transmit events;

a receiver programmed to respectively form first through fourth receive signals from electrical signals produced by said plurality of transducer elements subsequent to said first through fourth transmit events respectively;

a wall filter programmed with first through fourth sets of filter coefficients to decode and bandpass first through fourth fundamental signal components of said first through fourth receive signals respectively and selectively pass frequencies corresponding to wave energy reflectors moving at a velocity above a predetermined threshold, said wall filter forming a flow signal derived at least in part from said decoded and bandpassed first through fourth fundamental signal components and the selectively passed frequencies; and a subsystem for displaying an image having an image portion which is a function of at least said flow signal.

13. The system as recited in claim 12, wherein said third set of filter coefficients are the negative of said first set of filter coefficients, and said fourth set of filter coefficients are the negative of said second set of filter coefficients.

14. The system as recited in claim 12, wherein said third set of filter coefficients are the negative of said first set of filter coefficients, and said fourth set of filter coefficients are the negative of said second set of filter coefficients, with at least one pair of said filter coefficients being perturbed to allow B-mode fundamental signal feedthrough.

15. The system as recited in claim 12, wherein said wall filter comprises an FIR filter and a vector summer coupled to said FIR filter.

16. The system as recited in claim 12, wherein said transmitter is further programmed to activate a plurality of said transducer elements to transmit focused wave energy which is uncoded during a fifth transmit event, said receiver is further programmed to form a fifth receive signal from electrical signals produced by said plurality of transducer elements subsequent to said fifth transmit event, and said wall filter is further programmed with a fifth set of filter coefficients to bandpass a harmonic signal component of said fifth receive signal for summing with said flow signal for display.

17. The system as recited in claim 12, wherein said transmitter is further programmed to activate a plurality of said transducer elements to transmit focused wave energy which is uncoded during fifth and sixth transmit events, said uncoded focused wave energy of said fifth transmit event being of opposite polarity to said uncoded focused wave energy of said sixth transmit event, said receiver is further programmed to form fifth and sixth receive signals from electrical signals produced by said plurality of transducer elements subsequent to said fifth and sixth transmit events respectively, and said wall filter is further programmed with fifth and sixth sets of filter coefficients to bandpass respective harmonic signal components of said fifth and sixth receive signals for summing with said flow signal for display while substantially canceling respective fundamental signal components of said fifth and sixth receive signals.

18. The system as recited in claim 12, wherein said subsystem comprises:

a processing subsystem for forming a flow image signal from said flow signal; and a display subsystem programmed to display said image portion as a function of said flow image signal.

19. The system as recited in claim 12, wherein said transducer elements comprise piezoelectric elements for transmitting ultrasound waves in response to electrical activation and for transducing returned ultrasound waves into electrical signals.

20. An imaging system comprising:

a transducer array having a multiplicity of transducer elements for transmitting wave energy centered at a fundamental frequency in response to electrical activation and for transducing returned wave energy into electrical signals;

a display monitor for displaying an image having an image portion which is a function of a flow image signal; and a computer programmed to perform the steps of:
(a) activating transducer elements of said array to transmit focused wave energy encoded with a transmit code during first and second transmit events;
(b) forming first and second receive signals from electrical signals produced by said transducer elements subsequent to said first and second transmit events respectively;
(c) compressing, bandpassing and wall filtering first and second fundamental signal components of said first and second receive signals respectively to form a flow signal;
(d) forming a flow image signal derived at least in part from said flow signal; and
(e) applying said flow image signal to said display monitor.

21. The system as recited in claim 20, wherein said computer includes an FIR filter and a vector summer coupled to said FIR filter for performing step (c).

22. The system as recited in claim 20, wherein said transducer elements comprise piezoelectric elements for transmitting ultrasound waves in response to electrical activation and for transducing returned ultrasound waves into electrical signals.

23. An imaging system comprising:
a transducer array having a multiplicity of transducer elements for transmitting wave energy centered at a fundamental frequency in response to electrical activation and for transducing returned wave energy into electrical signals;
a display monitor for displaying an image having an image portion which is a function of a flow image signal; and
a computer programmed to perform the steps of:
(a) activating transducer elements of said array to transmit focused wave energy encoded with a first Golay code of a Golay code pair during first and third transmit events and to transmit focused wave energy encoded with a second Golay code of said Golay code pair during second and fourth transmit events;
(b) forming first through fourth receive signals from electrical signals produced by said transducer elements subsequent to said first through fourth transmit events respectively;
(c) decoding, bandpassing and wall filtering first through fourth fundamental signal components of said first through fourth receive signals respectively to form a flow signal;
(d) forming a flow image signal derived at least in part from said flow signal; and
(e) applying said flow image signal to said display monitor.

24. The system as recited in claim 23, wherein said computer includes an FIR filter and a vector summer coupled to said FIR filter for performing step (c).

25. The system as recited in claim 23, wherein said transducer elements comprise piezoelectric elements for transmitting ultrasound waves in response to electrical activation and for transducing returned ultrasound waves into electrical signals.

26. A method of operating an imaging system comprising a multiplicity of transducer elements for transmitting wave energy in response to electrical activation and transducing returned wave energy into electrical signals, and a display monitor for displaying an image having an image portion which is a function of a flow image signal, said method comprising the steps of:
(a) activating transducer elements of said array to transmit focused wave energy encoded with a transmit code during first and second transmit events;
(b) forming first and second receive signals from electrical signals produced by said transducer elements subsequent to said first and second transmit events respectively;
(c) compressing, bandpassing and wall filtering first and second fundamental signal components of said first and second receive signals respectively to form a flow signal;
(d) forming a flow image signal derived at least in part from said flow signal; and
(e) applying said flow image signal to said display monitor.

27. The method as recited in claim 26, further comprising the steps of:
(f) activating transducer elements of said array to transmit uncoded focused wave energy during a third transmit event;
(g) forming a third receive signal from electrical signals produced by said transducer elements subsequent to said third transmit event;
(h) bandpassing a harmonic signal component of said third receive signal; and
(i) summing said harmonic signal component and said flow signal.

28. The method as recited in claim 26, further comprising the steps of:
(f) activating transducer elements of said array to transmit uncoded focused wave energy during third and fourth transmit events, said uncoded focused wave energy of said third transmit event being of opposite polarity to said uncoded focused wave energy of said fourth transmit event;
(g) forming third and fourth receive signals from electrical signals produced by said transducer elements subsequent to said third and fourth transmit events respectively;
(h) bandpassing respective harmonic signal components of said third and fourth receive signals while substantially canceling respective fundamental signal components of said third and fourth receive signals respectively to form a harmonic background signal; and
(i) summing said harmonic background signal with said flow signal.

29. A method of operating an imaging system comprising a multiplicity of transducer elements for transmitting wave energy in response to electrical activation and transducing returned wave energy into electrical signals, and a display monitor for displaying an image having an image portion which is a function of a flow image signal, said method comprising the steps of:
(a) activating transducer elements of said array to transmit focused wave energy encoded with a first Golay code of a Golay code pair during first and third transmit events and to transmit focused wave energy encoded with a second Golay code of said Golay code pair during second and fourth transmit events;
(b) forming first through fourth receive signals from electrical signals produced by said transducer elements subsequent to said first through fourth transmit events respectively;
(c) decoding, bandpassing and wall filtering first through fourth fundamental signal components of said first through fourth receive signals respectively to form a flow signal;

(d) forming a flow image signal derived at least in part from said flow signal; and (e) applying said flow image signal to said display monitor.

30. The method as recited in claim 29, further comprising the steps of:

(f) activating transducer elements of said array to transmit focused wave energy which is uncoded during a fifth transmit event;

(g) forming a fifth receive signal from electrical signals produced by said transducer elements subsequent to said fifth transmit event;

(h) bandpassing a harmonic signal component of said fifth receive signal; and (i) summing said harmonic signal component and said flow signal.

31. The method as recited in claim 29, further comprising the steps of:

(f) activating transducer elements of said array to transmit focused wave energy which is uncoded during fifth and sixth transmit events, said uncoded focused wave energy of said fifth transmit event being of opposite polarity to said uncoded focused wave energy of said sixth transmit event;

(g) forming fifth and sixth receive signals from electrical signals produced by said transducer elements subsequent to said fifth and sixth transmit events respectively;

(h) bandpassing respective harmonic signal components of said fifth and sixth receive signals while substantially canceling respective fundamental signal components of said fifth and sixth receive signals respectively to form a harmonic background signal; and (i) summing said harmonic background signal with said flow signal.

32. An ultrasound medical diagnostic system for imaging stationary and moving reflectors for an area of interest in a patient, comprising:

a transmitter for transmitting a sequence of at least two B-mode pulses to a transmit focal position;

a receiver for receiving at least two B-mode echo signals associated with said sequence of at least two B-mode pulses, said B-mode echo signals containing a fundamental frequency component;

a filter for supplying a filtered signal containing flow image information for moving reflectors based on said at least two B-mode echo signals, said filtered signal containing B-mode information for stationary reflectors based on said at least two B-mode echo signals, said B-mode information for stationary reflectors including said fundamental frequency component; and a display for displaying a B-mode flow image of moving reflectors and a B-mode image of stationary reflectors based on said filtered signal supplied by said filter.

33. The system of claim 32, wherein said display is adapted to combine said B-mode flow image and said B-mode image in order to illustrate the flow of moving reflectors relative to stationary reflectors.

34. The system of claim 32, wherein said display is adapted to combine a color B-mode flow image and a B-mode image for display.

35. The system of claim 32, wherein said filter includes a wall filter for producing a weighted sum of said first and second B-mode echo signals to form a wall filtered signal with a ratio of stationary to moving reflectors determined by a wall filter scalar weighting factor.

36. The system of claim 32 further comprising means for amplitude detection of said filtered output signal to form a B-mode flow image signal.

37. The system of claim 32, wherein said transmitter is adapted to encode said sequence of at least two B-mode pulses with transmit codes to form a packet of coded broadband pulses transmitted with a given pulse repetition interval to a transmit focal position, said packet including up to six pulses.

38. The system of claim 32, wherein the transmitter is adapted to modulate each of said B-mode pulses with a predefined code sequence, each of said B-mode pulses having a predetermined transmit burst length.

39. The system of claim 32, wherein the transmitter is adapted to modulate first and second B-mode pulses with first and second separate predefined code sequences, respectively.

40. The system of claim 32, wherein the transmitter is adapted to modulate first through fourth B-mode pulses with first through fourth Golay code pair sequences.

41. An ultrasound medical diagnostic system for imaging stationary and moving reflectors for an area of interest in a patient, comprising:

a transmitter for transmitting at least first and second pulses;

a receiver for receiving at least first and second echo signals associated with said first and second pulses, respectively;

a filter for providing a weighted sum of said first and second echo signals to pass moving reflectors and to pass, at an attenuated level, stationary reflectors including fundamental components of said first and second echo signals, said weighted sum including at least first and second weights; and a display for imaging stationary components passed by said filter.

42. The system of claim 41, wherein the first and second weights are scalar weights.

43. The system of claim 41, wherein the filter is adapted to receive scalar weightings that form a wall filter for selectively passing signals form moving reflectors.

44. The system of claim 41, wherein the filter is adapted to receive first and second sets of filter coefficients associated with the first and second echo signals, respectively, said first and second sets of filter coefficients being different from each other.

45. The system of claim 41, wherein said transmitter is adapted to encode said at least first and second pulses with transmit codes to form a packet of coded broadband pulses transmitted with a given pulse repetition interval to a transmit focal position, said packet including up to six pulses.

46. The system of claim 41, wherein the transmitter is adapted to modulate each of said at least first and second pulses with a predefined code sequence, each of said pulses having a predetermined transmit burst length.

47. The system of claim 41, wherein the transmitter is adapted to modulate said first and second pulses with first and second separate predefined code sequences, respectively.

48. The system of claim 41, wherein the transmitter is adapted to modulate first through fourth B-mode pulses with first through fourth Golay code pair sequences, respectively.

49. A method for displaying B-flow ultrasound images, comprising;

transmitting at least first and second broadband pulses to a common transmit focal position;

receiving at least first and second ultrasound reflections associated with said at least first and second broadband pulses;

forming a B-mode flow signal component based on said at least first and second ultrasound reflections;

forming a B-mode signal component based on said at least first and second ultrasound reflections; and displaying a B-flow ultrasound image including a B-mode flow image component and a B-mode image component based on said B-mode flow signal component and said B-mode signal component.

50. The method of claim 49, wherein the transmitting step includes generating a common waveform for multiple pulses.

51. The method of claim 50, further comprising:

forming an envelope of a signal including said B-mode flow signal component and said B-mode signal component.

52. The method of claim 49, further comprising:

wall filtering across said first and second ultrasound reflections.

53. The method of claim 52, further comprising:

passing fundamental frequency components of a signal including said B-mode flow signal component and said B-mode signal component.

54. The method of claim 49, further comprising:

passing harmonic frequency components of a signal including said B-mode flow signal component and said B-mode signal component.

55. The method of claim 49, further comprising:

passing subharmonic frequency components of a signal including said B-mode flow signal component and said B-mode signal component.

56. The method of claim 49, further comprising:

summing ultrasound reflections to form said B-mode flow signal component and said B-mode signal component.

57. The method of claim 49, wherein the transmitting step includes transmitting a sequence of identical broadband pulses, centered at a fundamental frequency, to a particular transmit focal position.

58. The method of claim 49, further comprising:

bandpass filtering a fundamental frequency of said first and second ultrasound reflections substantially isolating a desired component of ultrasound reflections.

59. The method of claim 49, wherein the transmitting step includes encoding said sequence of at least two B-mode pulses with transmit codes to form a packet of coded broadband pulses transmitted with a given pulse repetition interval to a transmit focal position, said packet including up to six pulses.

60. The method of claim 49, wherein the transmitting step includes modulating each of said B-mode pulses with a predefined code sequence, each of said B-mode pulses having a predetermined transmit burst length.

61. The method of claim 49, wherein the transmitting step includes modulating first and second B-mode pulses with first and second separate predefined code sequences, respectively.

62. The method of claim 49, wherein the transmitting step includes modulating first through fourth B-mode pulses with first through fourth Golay code pair sequences, respectively.

* * * * *